Dec. 3, 1929.   G. WOLLENSCHLAGER   1,737,989
PIPE SUPPORT
Filed June 16, 1928
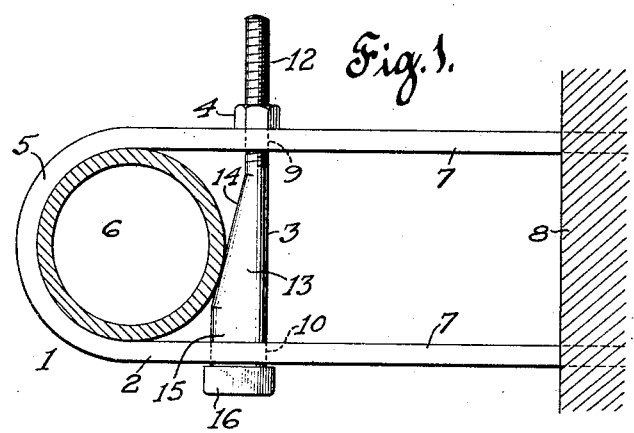
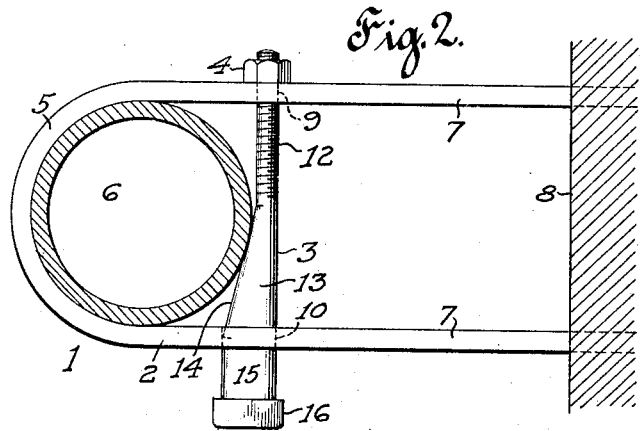
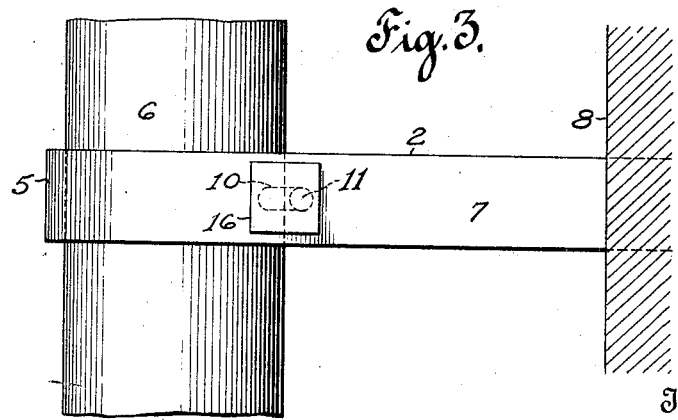
Inventor
George Wollenschlager,
By his Attorney
Benjamin Roman.

Patented Dec. 3, 1929

1,737,989

UNITED STATES PATENT OFFICE

GEORGE WOLLENSCHLAGER, OF NEW YORK, N. Y.

PIPE SUPPORT

Application filed June 16, 1928. Serial No. 285,859.

This invention relates to pipe supports, and its principal object is to provide a simple, inexpensive, conveniently and economically manufacturable, conveniently and economically utilizable, light, strong, durable, efficient, and improved pipe support.

Other objects and advantages will hereinafter appear.

In the accompanying drawings,—

Fig. 1 is a plan view of the pipe support of this invention.

Fig. 2 is a plan view similar to that shown in Fig. 1, but showing the manner in which the same bolt member of the invention may be utilized in connection with supporting pipes that are larger in diameter than the one shown in Fig. 1.

Fig. 3 is an elevation of the pipe support shown in Fig. 2.

The pipe support 1 comprises a metallic band 2, a transverse bolt 3, and a locking nut 4. Said band is preferably U-shape as shown, and its bent portion 5 is of a radius conforming to the contour of the pipe 6 to be supported or secured in the required position, the ends of the arms 7 of the band being fastened in any desired manner to a wall or any rigid member 8. One of the arms 7 is provided with a round opening 9, and the other arm is provided with a slotted or elongated opening 10 the width of which is equal to the diameter of the opening 9 and one end 11 of which is in registry with the same opening. The bolt 3 comprises a threaded shank or end-portion 12, a body-portion 13 which has an oblique side 14, a flattened end-portion 15 which conforms to the elongated opening 10, and a manipulating head 16. When the bolt 3 is passed transversely of the arms 7 through the openings 9, 10 in the manner shown, its oblique side 14 bears against the pipe 6 and forces it against the bent portion 5 of the band 2, and tightening of the nut 4 against the band-arm 7 draws the bolt 3 forcefully against the pipe 6 and thereby fastens it firmly in supported state between it and the bent portion 5 of the metallic band. It will be thus evident that erection of the piping with this pipe support requires merely the location of the pipe 6 within the band 2, insertion of the bolt 3 through holes 9, 10, and then tightening of the nut 4. The bolt portion 3 of this pipe support may be utilized for supporting pipes of several dimensions, as illustrated in Figs. 1, 2, wherein the identical bolt 3 is used in connection with bands 2 of different sizes to support pipes of different diameters.

Variations may be resorted to within the scope of the invention, and portions of the improvements may be used without others.

Having thus described my invention, I claim:—

A pipe support having the combination of a band adapted to embrace the pipe, the arms of said band having a pair of openings, a bolt having a threaded end adapted to pass through one of said openings, said bolt having an oblique side adapted to bear against the pipe, said bolt having a flattened end adapted to pass through the other of said openings and being prevented from rotation by engagement therewith, and a nut on said threaded end drawing the bolt to force the pipe against the band.

Signed at the city of New York, in the county of New York, and State of New York, this 13th day of June, A. D. 1928.

GEORGE WOLLENSCHLAGER.